United States Patent [19]

Shapiro et al.

[11] 4,422,652

[45] Dec. 27, 1983

[54] RELEASABLY RETAINING ARTICLES FOR ROTATION THEREOF

[75] Inventors: Alan K. Shapiro, Shillington; Henry R. Siebach, Wyomissing Hills, both of Pa.

[73] Assignee: Western Electric Co., Inc., New York, N.Y.

[21] Appl. No.: 369,059

[22] Filed: Apr. 16, 1982

[51] Int. Cl.³ .................... B23B 31/00; B23Q 3/152
[52] U.S. Cl. ........................................ 279/1 M; 269/8
[58] Field of Search ............... 409/234, 232; 279/1 M; 269/8; 65/57, 109; 156/158, 304.2, 503

[56] References Cited

U.S. PATENT DOCUMENTS

| | | | |
|---|---|---|---|
| 2,676,504 | 4/1954 | Brugge et al. | 268/8 |
| 2,713,379 | 7/1955 | Sisson | 269/8 |
| 2,999,289 | 9/1961 | Tenger | 269/8 X |
| 3,226,888 | 1/1966 | Erenyi | 269/8 |
| 3,837,084 | 9/1974 | Johnson | 269/8 X |
| 4,152,190 | 5/1979 | Kurosawa et al. | 269/8 X |

FOREIGN PATENT DOCUMENTS

| | | | |
|---|---|---|---|
| 471056 | 2/1929 | Fed. Rep. of Germany | 279/1 M |
| 631677 | 6/1936 | Fed. Rep. of Germany | 269/8 |
| 904972 | 1/1954 | Fed. Rep. of Germany | 279/1 M |
| 367900 | 2/1932 | United Kingdom | 269/8 |

OTHER PUBLICATIONS

Beltz et al., "Magnetic Holding of a Nonmagnetic Article" Western Elec. Tech. Digest No. 23, 7-1971, pp. 3; 269-8.

Primary Examiner—William R. Briggs
Attorney, Agent, or Firm—D. C. Watson

[57] ABSTRACT

Apparatus is provided for releasably retaining an article such as an optical cable (10) for rotation of the article. A chuck body (31) is provided along with components (24, 26 and 46–48) for rotating the body (31) and the cable (10) about a common central axis (33). A jaw (34) is affixed to the body (31) and disposed generally laterally of the axis (33). A movable jaw (35) is provided having at least mating surfaces which are complementary to the fixed jaw (34) for mounting thereto and grasping therebetween the cable (10) disposed about the axis (33). Magnetic devices are associated with the jaws (34 and 35) for releasably mounting the movable jaw to the fixed jaw for releasably retaining a cable (10) therebetween. For example, first and second magnets (36 and 37), respectively, may be made a part of a jaw such as movable jaw (35) and be disposed astride the central axis (33). A north pole face of magnet (36) and a south pole face of magnet (37) may communicate with each other through jaw (35) which may advantageously contain a magnetic material. At opposite south and north pole faces of magnets (36 and 37), an interconnecting magnetic plate (39) may be utilized to close the flux path between the magnets, at least when movable jaw (35) is mounted to jaw (34). Other seat magnets (43 and 44) may communicate with a magnetic ferrule (13) on cable (10) such that articles may be mounted and demounted to movable jaw (35) under more convenient circumstances than those available in the fixed jaw (34).

10 Claims, 3 Drawing Figures

RELEASABLY RETAINING ARTICLES FOR ROTATION THEREOF

TECHNICAL FIELD

This invention relates to releasably retaining articles for rotating such articles. More particularly, the invention relates to magnetic devices for releasably retaining flexible articles, such as optical cables, for rotatably heat forming end portions thereof.

BACKGROUND OF THE INVENTION

Light transmission cables for telecommunications work typically include a thin fiber of glass enclosed within a sheath of tough plastic material for protection. At a receiving end of the fiber, there is often formed a globular lens portion for focusing upon an electronic device which converts a light signal into an electrical signal. Such lens portion should be precisely formed from the glass, closely concentrix with the axis of the fiber and without bubbles or stress cracks.

A typical method of forming the lens has been to suspend a cable vertically and to horizontally reciprocate an end of the fiber in and out of a flame produced by a gas jet. As an end portion was treated, the end was repeatedly measured until a desired globular portion was completely formed. However, the globe sometimes grew too large or lateral bending occurred, due inter alia, to non-uniform heating and unilateral thrusting from the gas jet. As a result, defective globe portions often had to be removed and the process repeated until proper lenses were formed. Consequently, there is a need for more positive retention of the work combined with steady rotation thereof to obtain better distribution of heat and forces upon a glass end being treated. Such retention and rotation of workpieces is often provided by a class of devices referred to in the art as "chucks" which are rotated in conventional apparatus.

Conventional chucks generally include gears and/or cams which provide great mechanical advantage in compressing and thereby securing a workpiece for rotation in a lathe or a drill press. However, glass fibers should be more delicately handled and compression thereof more carefully controlled. Moreover, conventional chucks are not usually equipped to accommodate a flexible length of cable for rotation of an end portion of fiber. Even those chucks which may be adapted to the described procedure for forming lenses, require tedious steps to carefully mount and demount a cable, and such steps are time consuming.

SUMMARY OF THE INVENTION

In accordance with the present invention, apparatus for releasably retaining an article for rotation thereof includes a chuck body adapted for rotation about a central axis. A jaw is affixed to the chuck body and disposed generally laterally of the central axis. A movable jaw is also provided, complementary with and mountable to the fixed jaw, for grasping therebetween, an article disposed about the central axis. Magnetic accessories are provided for releasably mounting the movable jaw to the fixed jaw for releasably retaining therebetween an article for rotation about the central axis.

BRIEF DESCRIPTION OF THE DRAWING

The invention will be more readily understood from the following detailed description thereof when read in conjunction with the accompanying drawing, wherein.

DETAILED DESCRIPTION

The Articles

Figure 2:
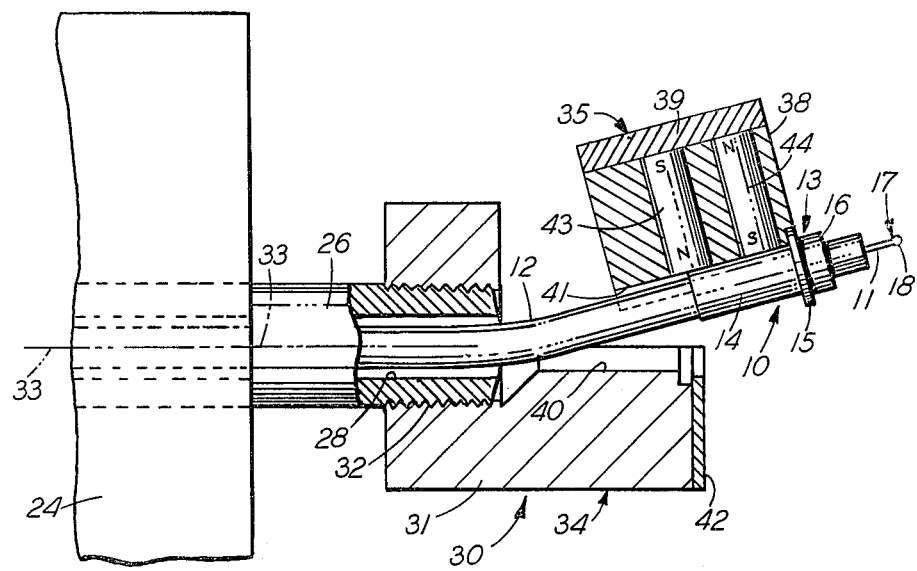
FIG. 2 is an enlarged side view, partially in section, showing jaws for retaining a flexible cable being mounted therebetween.

In FIG. 2 there appears an enlarged version of an elongated, flexible article 10 which is releasably retained and rotated in the practice of the invention. For purposes of illustration and discussion, such an article will often be referred to herein as an optical cable 10, or merely a cable 10. Nevertheless, it is to be understood that other articles which are neither elongated nor flexible may be releasably retained and rotated in the practice of the invention. The article 10, shown in FIG. 2, is merely illustrative of a particularly difficult article to releasably retain for such rotation.

Article 10 may be an optical cable containing a fiber 11 of glass which is especially prepared to transmit light at a given wavelength over a given distance with minimal losses. Fiber 11 may be about 0.008 inch thick and be enclosed within a sheath 12 (FIG. 2) for protection. Sheath 12 may include a clear plastic coating over fiber 11, then a layer of white polyvinylchloride and then a textile having very tough strands such as those sold under the tradename "Kevlar" by E. I. DuPont de Nemours Company of Wilmington, Delaware. Over the textile there is generally applied another layer of polyvinylchloride, often in a light green or white color for identification purposes. The outside of sheath 12 may be about 0.100 inch in diameter and any particular length of cable 10 may have devices applied to the ends for protection or for connection to other cables or apparatus.

The cable 10, shown in FIG. 2, may typically be about 8–10 inches long and have a ferrule 13 applied over sheath 12 for an end connection, for example, to a light receiver (not shown). Ferrule 13 may advantageously be made of a magnetic material, i.e., a material which is attracted to a magnet, for example, a ferrous material. Ferrule 13 has a sleeve 14 which is attached to sheath 12, a flange 15 and a shoulder sleeve 16. A portion of fiber 11 generally extends beyond sleeve 16 and the sheath 12 is removed after sleeve 14 to expose an end portion 17 of fiber 11.

Light is emitted from end portion 17 when cable 10 is in service and it is desirable to pass such light through a globular lens 18 formed from glass in fiber 11. For a fiber 11 of glass having a diameter of about 0.008 inch a suitable globular lens 18 advantageously has a size of at least 0.0118 inch and not more than 0.0128 inch in diameter. It will be appreciated that forming a lens 18 to such a precise size without bubbles and stress cracks is a challenging task.

General Arrangement

Figure 1:
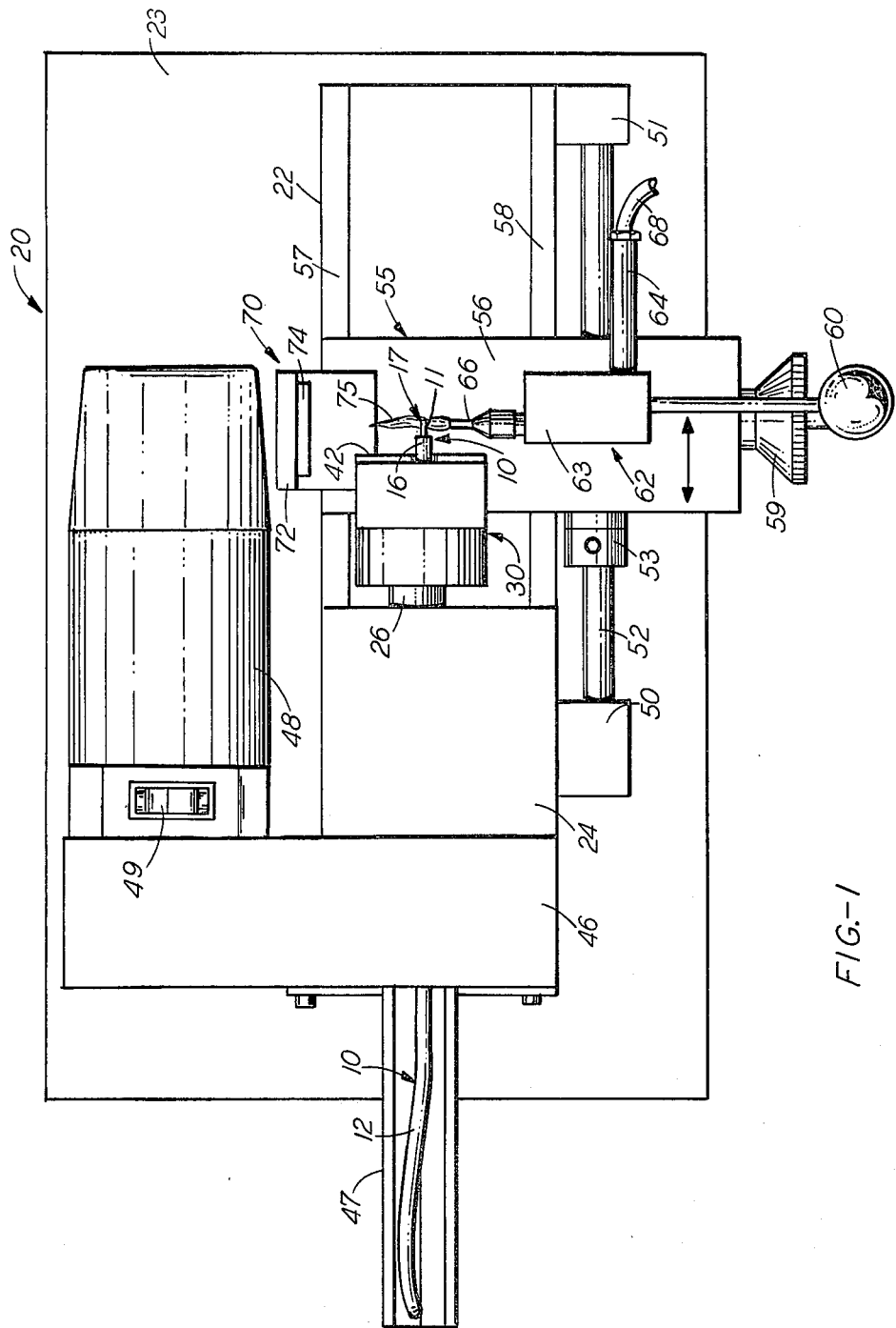
FIG. 1 is a plan view showing apparatus of the instant invention in a lathe and torch arrangement for forming a lens portion on a fiber.

FIG. 1 illustrates apparatus 20 which is suitable for forming lens 18 from an end 17 of a glass fiber 11 according to the invention. Apparatus 20 is preferably arranged as a lathe having a bed 22 mounted to a base plate 23. Bed 22 supports a headstock 24 which includes bearings (not shown) to support a spindle 26 extending from a chuck 30 into a pulley section 46. Spindle 26 has a through-bore 28 (FIG. 2) of about 0.40 inch in diameter to accommodate a cable 10 which is threaded therethrough and extends out of section 46 to a trough 47. Trough 42 supports the article 10, permitting the full length of cable to turn in response to rotation of chuck 30 which will be explained hereinafter. Spindle 26 is incidentally rotated by a system of pulleys (not shown) in section 46 which are driven by a motor 48 having an external switch 49.

Along the front of apparatus 20, the lathe bed 22 includes brackets 50 and 51 which, in turn, support a guide rail 52 having installed thereon an adjustable stop 53. On top of bed 22, a carriage 55 is shown for supporting a torch assembly which can be translated along or across bed 22 in applying heat to end portion 17 of fiber 11.

The carriage 55 includes a slide member 56 which rides on guideways 57 and 58 of bed 22 and on guiderail 52. Slide 56 is adjustable across bed 22 by a handwheel 59 and is movable along bed 22 by pressure applied to hand lever 60. Carriage 55 is then manually pushed to a non-operable position against bracket 51 or to the operating position shown in FIG. 1 against stop 53.

On top of slide 56 there is mounted a torch assembly 62 having a block 63 supporting a tube 64. A nozzle 66 is disposed at the outlet end of tube 64, and at the inlet end a flexible tube 68 is connected to a gas source containing at least a flow control valve (neither the source nor the valve being shown). Across from nozzle 66, a heat shield 70 is provided which includes a stand 72, supporting a short section 74 of a large diameter tubing containing a ceramic media to absorb heat from a flame 75 produced at nozzle 66.

It is believed that the operation of apparatus 22 is self explanatory from the above description of the components. Apparatus 20 includes many features which are advantageously provided in a lathe assembly made in Austria and sold under the trade designation "EMCO Unimat 3" by Edmund Scientific Co., Barrington, New Jersey. Such a lathe assembly is modified in accordance with this invention by additional features to obtain secure positioning and steady rotation of cable 10. In particular, a novel chuck 30 has been devised to rapidly mount and releasably retain cables 10 in a production environment. The details of chuck 30 are better seen elsewhere in the drawing.

Chucks For Releasably Retaining Articles

FIG. 2 illustrates at least one embodiment of a chuck 30 which facilitates readily mounting and demounting an article 10 and releasably retaining the same for rotation thereof. For purposes of illustration, FIG. 2 has been drawn to indicate a condition where a fiber 11 has been treated and cable 10 is being demounted from chuck 30 as will be more fully explained hereinafter.

A chuck body 31 has a threaded socket 32 for connection to apparatus for rotation about a central axis 33. Such apparatus preferably includes the spindle 26, head stock 24, pulley section 46 and motor 48 shown in FIG. 1. It will be apparent that axis 33 is central and common to the body 31, the spindle 26 and the article 10 when such article is actually seated and being rotated.

A jaw 34, affixed to chuck body 31, is preferably disposed generally laterally of central axis 33. As shown in FIG. 2, jaw 34 may advantageously be formed from the same member as chuck body 31. A movable jaw 35 is mountable to the fixed jaw 34 for grasping therebetween an article such as cable 10 when it is disposed about central axis 33. Of course, jaw 35 advantageously is complementary, at least along its mating surfaces, to the fixed jaw 34.

Jaws 34 and 35 may be held together by suitable clamping mechanisms which provide adequate retention of an article 10 when chuck 30 is rotated at a speed sufficient for work being done on such article. When utilizing the apparatus 20 shown in FIG. 1 for forming lenses on the described fibers 11, a speed of about 550 RPM is preferred. However, retention under the forces generated by such speed is further complicated by the problem of mounting and demounting a delicate, flexible article such as cable 10 in a production environment. For such problems it has been found that retaining jaws 34 and 35 with magnetic devices offers many advantages even though centrifugal and vibratory forces generated during rotation may often work seriously against magnetic retention devices. For the purposes herein such magnetic devices may include magnets alone or magnets and cooperative magnetic materials.

Figure 3:
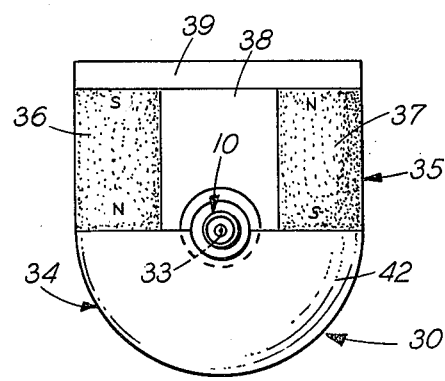
FIG. 3 is an end view of the jaws shown in FIG. 2 after assembly thereof.

A preferred form of retention by magnetic devices is shown in FIGS. 2 and 3. For example, FIG. 3 illustrates magnets 36 and 37, preferably associated with jaw 35 and, in this case, jaw 34 preferably contains a cooperative magnetic material such as cold rolled steel. A suitable material for magnets 36 and 37 has a high residual magnetism such as that sold under the trade designation, "Indox 5" by Indiana General Company, a Division of Electronic Memories and Magnetics Corporation, Valparaiso, Indiana.

Between magnets 36 and 37, there is a middle member 38 in jaw 35, preferably made of a generally nonmagnetic material such as an appropriate stainless steel. Across the top of jaw 35, there is a magnetic plate 39 preferably made of a magnetic material such as cold rolled steel. The described accessories, both magnetic and nonmagnetic, have proven advantageous for reasons which will now be explained.

Magnets 36 and 37 are of relatively equal magnetic strength and are disposed astride the central axis 33 as shown in FIG. 3. A north pole face of magnet 36 and a south pole face of magnet 37 communicate with each other through the magnetic material in jaw 34. At opposite south and north pole faces of magnets 36 and 37, respectively, the interconnecting plate 39 of jaw 35 also provides a flux path for communication between the two magnets. Furthermore, the middle member 38 provides flux exclusion because it is of a nonmagnetic material. Therefore, the magnets 36 and 37 communicate with each other in an optimum closed path for magnetic lines of force. Consequently, jaw 34 and jaw 35 may be firmly, but releasably mounted together for grasping articles 10 disposed about central axis 33, whether such articles are magnetic or nonmagnetic.

It will be apparent in FIG. 2, that a cable 10, having a ferrule 13 and a fine glass end portion 17 is a delicate article with fine features. To firmly seat the ferrule 13 there have been provided complementary seat portions 40 and 41 in jaw 34 and jaw 35, respectively. A nonmagnetic plate 42 having a cutout for sleeve 16 has been added to jaw 34 to retain a portion of flange 15 in a recess formed in seat portion 40. Also, a similar recess has been formed in seat portion 41 to retain the remainder of flange 15 in jaw 35. Applying and removing a ferrule 13 of a cable 10 to seat portions 40 and 41 can be a tedious task if one must do so at arm's length. Consequently, jaw 35 has been made completely removable so that, at least with regard to seat portion 41, ferrule 13 can be applied and removed in close proximity to one's eyes along with the benefit of a light or a magnifying device if desired for better viewing. FIG. 2 clearly indicates a step of removing jaw 35 from jaw 34 along with an article 10 so said article can be demounted and replaced under more convenient circumstances than in fixed jaw 34.

It has further been found, when handling magnetic articles, such as a cable 10 having a magnetic ferrule 13, that at least one additional magnet may be usefully employed in one of the jaws 34 or 35. The function of such a magnet is to retain a magnetic portion of an article 10 such as ferrule 13 in a seat portion such as portion 41 to facilitate mounting and demounting. It is presently preferred to use magnets 43 and 44 in jaw 35 and installed in middle member 38 with alternating pole faces as shown in FIG. 2. Magnets 43 and 44 may be pin magnets having a diameter about the same as the width of a ferrule 13. A suitable material for such magnets combines aluminum, nickel and cobalt and is sold under the trade designation as "Alnico 5 or 8" by the aforementioned Indiana General Company.

Notice the close communication of magnets 43 and 44 with ferrule 13 and with flux conductive plate 39. Such arrangement permits a closed conductive path for magnets 43 and 44 to communicate through ferrule 13 with minimal losses to other components or to the environment. The arrangement also permits an article 10 to be mounted and demounted in jaw 35 under convenient, manipulative and readily viewable circumstances, as explained previously.

It will be appreciated that releasably mounting jaw 35 to jaw 34 by magnetic devices provides for controlling the compression upon an article 10. For example, when magnets 36 and 37 were selected to provide an acceptable compression of cable 10, a force of about 2.64 lbs. (1200 grs.) was found to be adequate to demount jaw 35 from jaw 34. These and other sizes and relationships adapted to a cable 10 in a production environment are readily ascertainable by one of ordinary skill in the art with little experimentation.

Alternate Embodiments

There have been illustrated herein certain embodiments of the invention and certain applications thereof. Nevertheless, it is to be understood that various modifications and refinements may be made and used which differ from the disclosed embodiments without departing from the spirit and scope of the illustrated invention.

For example, jaw holding magnets 36 and 37 and accessories 38 and 39 are shown installed in jaw 35. Nevertheless, it will be apparent that similar magnets and accessories could as well be installed in jaw 34 alone or in both jaws 34 and 35 in the practice of the invention. Also, the chuck 30 has been operatively described with respect to a lathe arrangement for rotation of articles 10. Nevertheless, it will be apparent that a chuck 30 and an article 10 could as well be rotated by a drill press arrangement of apparatus 20. In fact, the supplier of the Unimat 3 provides apparatus similar to that described to rotate chucks in a drill press arrangement. It will, of course, be appreciated that it is desirable in such case to have a rotating spindle 26 with a central bore 28 to accommodate at least a flexible portion when rotating elongated articles such as cables 10.

What is claimed is:

1. Apparatus for releasably retaining an article for rotation thereof, comprising:
    a chuck body and means for rotating the same about a central axis thereof;
    a first jaw associated with the chuck body and disposed generally laterally of the central axis;
    a second jaw, complementary with and mountable to the first jaw, at least one of said jaws having seat means aligned generally parallel to said central axis to receive said article such that a generally longitudinal axis of the article is substantially coincident with the central axis of the chuck body; and
    magnetic means, associated with said jaws, for releasably mounting the second jaw to the first jaw, for releasably retaining therebetween an article for rotation about the central axis.

2. Apparatus as in claim 1, wherein the first jaw contains a magnetic material and the magnetic means further comprises:
    at least one magnet associated with the second jaw.

3. Apparatus as in claim 2, wherein the second jaw further comprises:
    first and second magnets of substantially equal magnetic strength disposed astride the central axis.

4. Apparatus as in claim 3, wherein the magnets are oriented with a north pole face of a first magnet and a south pole face of a second magnet communicating with each other through the first jaw when said second jaw is mounted to said first jaw further comprising at opposite south and north pole faces of the magnets:
    a magnetically permeable plate interconnecting such opposite pole faces thereby closing a path for flux to readily communicate between the two magnets.

5. Apparatus as in claim 4, wherein complementary seat portions are formed in the first and second jaw to accommodate an article disposed therebetween about the central axis, further comprising for retaining magnetic articles:
    at least one seat magnet in close communication with an article retained in the seat portions.

6. Apparatus as in claim 5, wherein the first jaw is affixed to the chuck body and the second jaw is separable from and movable away from the first jaw and the chuck body and further wherein the seat magnet is associated with the movable jaw such that a magnetic article may be retained therein when said jaw is separated from the fixed jaw.

7. Apparatus as in claim 1 for retaining flexible, elongated, magnetic articles and wherein a bore is provided along at least a portion of the central axis to accommodate at least a flexible portion of the article for rotation of said portion.

8. A method of releasably retaining an article for rotation thereof, comprising:
    rotating a chuck body about a central axis thereof;
    applying a first jaw to the chuck body disposed generally laterally of the central axis;
    disposing an article such that a generally longitudinal axis of the article is substantially coincident with the central axis of the chuck body while substantially simultaneously applying a second jaw to the first jaw, said second jaw being complementary with said first jaw such that said article is grasped therebetween; at least one of said jaws having seat means aligned generally parallel to said central axis to receive said article and applying magnetic means to said jaws to releasably mount said second jaw to said first jaw to releasably retain therebetween the article for rotation about the central axis.

9. A method as in claim 8, wherein the step of applying the magnetic means further comprises:

orienting on the second jaw, a first magnet with a north pole face and a second magnet with a south pole face in communication with each other through magnetic material contained in the first jaw and, at opposite south and north faces of the two magnets;

interconnecting a magnetically permeable plate between such opposite pole faces thereby permitting flux to readily communicate between the first and second magnets.

10. A method as in claim 9, wherein the first jaw is affixed to the chuck body and the second jaw is separable and movable away from the first jaw and the chuck body and wherein applying the magnetic means further comprises for an article having at least one magnetic portion:

applying at least one magnet in the movable jaw in close communication with a seat for the magnetic portion of the article such that the article is releasably mounted to the movable jaw at a convenient location away from the fixed jaw and disposed along the central axis as the movable jaw is applied to the fixed jaw.

* * * * *